United States Patent [19]

Rudolph et al.

[11] Patent Number: 4,556,402
[45] Date of Patent: Dec. 3, 1985

[54] PROCESS OF GASIFYING SOLID FUELS IN A MOVING BED AND IN A FLUIDIZED BED

[75] Inventors: Paul Rudolph, Bad Homburg; Martin Hirsch, Friedrichsdorf, both of Fed. Rep. of Germany

[73] Assignee: Metallgesellschaft Aktiengesellschaft, Frankfurt am Main, Fed. Rep. of Germany

[21] Appl. No.: 589,602

[22] Filed: Mar. 14, 1984

[30] Foreign Application Priority Data

Mar. 22, 1983 [DE] Fed. Rep. of Germany ....... 3310220

[51] Int. Cl.$^4$ ............................. C10J 3/16; C10J 3/54
[52] U.S. Cl. .................... 48/197 R; 48/202; 48/206
[58] Field of Search ...................... 48/197 R, 202, 206

[56] References Cited

U.S. PATENT DOCUMENTS

| | | | |
|---|---|---|---|
| 3,966,633 | 1/1976 | Friedman | 48/202 |
| 3,966,634 | 1/1976 | Sacks | 48/202 |
| 3,971,635 | 7/1976 | Matthews | 48/202 |
| 4,426,810 | 1/1984 | Rudolph et al. | 48/197 R |

Primary Examiner—Peter Kratz
Attorney, Agent, or Firm—Sprung Horn Kramer & Woods

[57] ABSTRACT

Coarse-grained fuels are gasified in a moving bed under a pressure of 5 to 150 bars with oxygen, water vapor and, if desired, carbon dioxide. The resulting product gas is at temperatures of 250° to 700° C. and is cooled to temperatures in the range from 120° to 220° C. to form an aqueous condensate, which contains distillation products and is known as gas liquor. The gas liquor obtained by the gasification in a moving bed is pressure-relieved to atmospheric or a higher pressure and the flashed-off vapor is supplied to the fluidized bed gasifier. In the fluidized bed gasifier, fine-grained solid fuels are gasified under a pressure which is lower than that in the moving bed.

The flashed-off vapor supplied to the fluidized bed supplies at least one-half of the water vapor required for the gasification in the fluidized bed. The water vapor contained in the product gas formed by the gasification in the fluidized bed is cooled and the resulting condensate is treated separately from the gas liquor obtained by the gasification in a moving bed.

12 Claims, 1 Drawing Figure

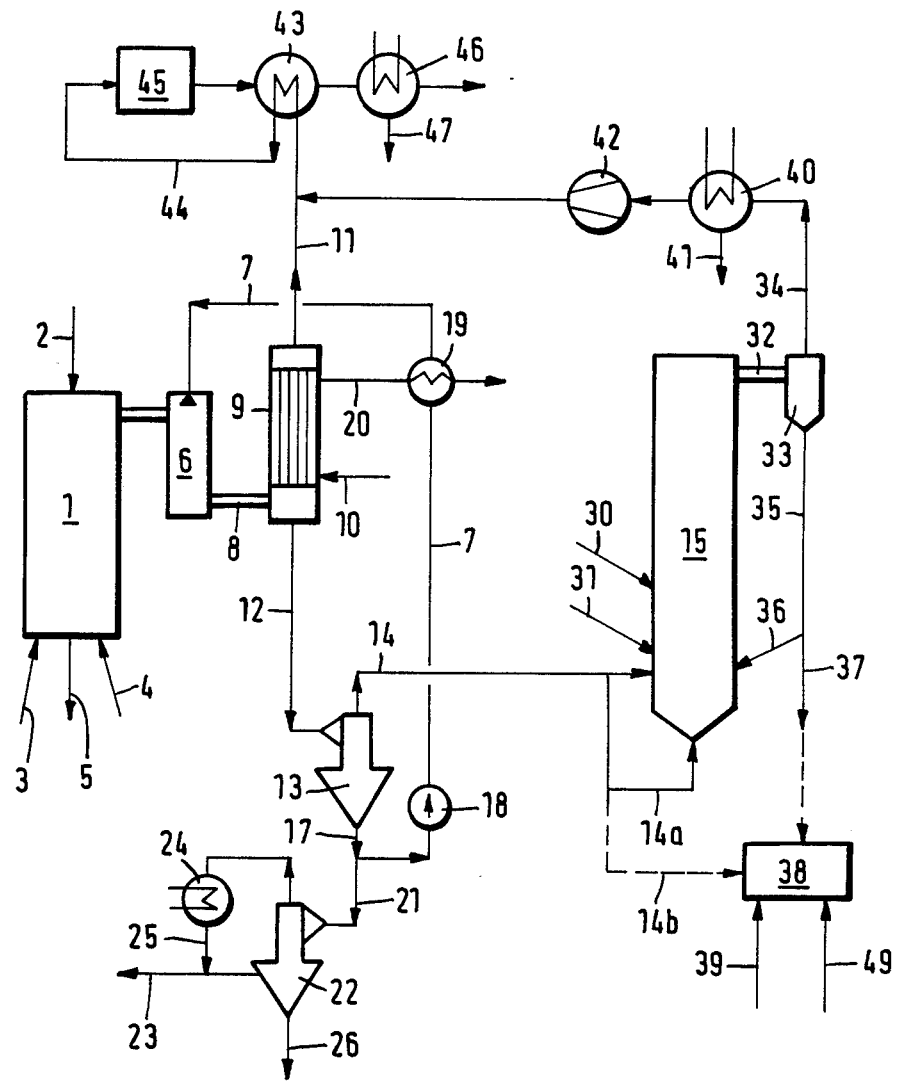

PROCESS OF GASIFYING SOLID FUELS IN A MOVING BED AND IN A FLUIDIZED BED

BACKGROUND OF THE INVENTION

1. Field of the Invention

This invention relates to a process of gasifying solid fuels with gasifying agents containing oxygen, water vapor and, if desired, carbon dioxide, in a moving bed and in a fluidized bed. Coarse-grained solid fuels are gasified under a pressure of 5 to 150 bars in a moving bed, which is slowly descending. The gasifying agents are introduced into said bed from below. Incombustible mineral constituents are withdrawn from the bottom of the bed as solid ash or liquid slag. A product gas at temperatures of 25° to 700° C. is withdrawn from the moving bed gasifier and is cooled to temperatures of 120° C. to form an aqueous condensate (gas liquor), which contain distillation products. Fine-grained solid fuels are gasified in the fluidized bed at lower pressures than are used in the moving bed and product gas at a temperature of 800° to 1200° C. is thus produced.

2. Discussion of Prior Art

It is know that solid fuels, such as coal, lignite or peat, can be gasified in a moving bed, which is sometimes called a fixed bed or in a fluidized bed. The gasification in a moving bed is described, e.g., in Ullmann's Encyklopadie der technischen Chemie, 4th edition (1977), on pages 383 to 386 of volume 14. Details of that known gasification process are apparent from U.S. Pat. Nos. 3,540,867 and 3,854,895. The gasification of solid fuels in a moving bed with a withdrawal of liquid slag has been described in British Pat. Nos. 1,507,905; 1,506,671 and 1,512,677. U.S. Pat. No. 4,347,064 and German Offenlegungsschrift No. 31 13 993 disclose the gasification in a circulating fluidized bed. A process in which a gasification in a moving bed and a gasification in a fluidized bed are combined is described in German Offenlegungsschrift No. 31 38 124 corresponding to U.S. Pat. No. 4,426,810 of January 24, 1984.

A granular fuel to be gasified in a moving bed should preferably have particle sizes in the range from 3 to 80 mm so that the bed is sufficiently permeable to gas. A moving bed can be used to gasify solid fuels at a high throughput rate and with a high efficiency but the raw gas is rich in distillation products because a countercurrent operation is performed in which the raw gas leaving the fuel bed is at a relatively low temperature, in most cases in the range from about 300° to 650° C. At these temperatures the distillation products escaping from the upper portion of the fuel bed, such as tar, oil, naphtha, phenols and fatty acids, are not decomposed but remain in the raw gas leaving the gas generator. When the raw gas is subsequently cooled, a major part of these distillation products condenses together with the water vapor to form a condensate known as gas liquor.

The gas liquor must be withdrawn from the process and must be separated into its components. This is effected in known manner, e.g., in plants for extracting the phenols, for stripping off the ammonia, and for removing residual phenols and fatty acids by a biological treatment.

SUMMARY OF INVENTION

It is an object of the invention to simplify the treatment of the gas liquor. In the process described first hereinbefore this is accomplished in accordance with the invention in that gas liquor obtained by the gasification in the moving bed is pressure-relieved to the atmospheric or a higher pressure and vapor which has thus been flashed off is supplied to the fluidized bed gasifier. Before the pressure relief, the gas liquor is under a pressure which approximately is the same as the pressure in the moving bed gasifier. The pressure can preferably be reduced by at least 2 bars to a pressure which is higher than that in the fluidized bed gasifier.

The major constituent of the flashed-off vapor is water vapor, which is used as a gasifying agent in the fluidized bed gasifier, which is also supplied with oxygen or air. The flashed-off vapor also contains vapors of phenols, fatty acid and ammonia, which at the temperatures in the fluidized bed reactor are gasified together with the coal. The raw gas leaving the fluidized bed gasifier is at a temperature in the range from 800° to 1200° C.

At least 50 percent of the water vapor required as a gasifying agent in the fluidized bed can be supplied to the fluidized bed in the form of the flashed-off vapor. It is desirable to ensure that vapor is flashed off at such a rate that said vapor supplies the fluidized bed gasifier with all water vapor required therein. The fluidized bed can be supplied with additional flashed-off vapor, which is not longer decomposed but used only for the shift conversion reaction $(CO + H_2O = CO_2 + H_2)$ taking place during the gasification. But phenols and fatty acids will be removed also from that water vapor.

When the raw gas produced by the gasification in the fluidized bed is cooled, a condensate forms which is free of organic constituents and contains only a small proportion of inorganic substances other than water. By the methods used also for treating fresh water, the resultant aqueous condensate can be treated for use as cooling water or feed water.

The rate at which vapor is flashed off increases with the rate of gas liquor which is subjected to the pressure relief and with the difference between the temperatures of the gas liquor before and after the condensation. For this reason, the largest possible quantity of the gas liquor which is left after the pressure relief is sprayed at the highest possible temperature into the hot raw gas leaving the moving bed gasifier. The gas liquor is preferably sprayed into the raw gas in a scrubber-cooler, which is connected to the gasifying reactor, so that the raw gas is cooled and saturated with water vapor by the sprayed gas liquor.

Gas liquor is formed in a succeeding waste heat boiler and is withdrawn from it. In order to ensure that the temperature of the gas liquor which has left the scrubber-cooler and has not yet been pressure-relieved is as high as possible so that vapor is flashed off at the highest possible rate when the gas liquor is pressure-relieved to a superatmospheric pressure, the gas liquor to be recycled to the scrubber-cooler may be heated, for instance, with waste heat. In that case, gas liquor at a sufficiently high temperature will always be available at a high rate for being pressure-relieved to the atmospheric or a superatmospheric pressure.

BRIEF DESCRIPTION OF DRAWING

An embodiment of the process is shown on the accompanying drawing which is a flow diagram.

DESCRIPTION OF SPECIFIC EMBODIMENT

In a gasification reactor 1, granular coal supplied through a line 2 is gasified in known manner in a moving bed under a pressure of 5 to 150 bars. The moving bed is supplied at its bottom with water vapor through line 3 and with oxygen or air through line 4. Incombustible matter is removed through line 5. The raw gas produced by the gasification is intensely contacted in a scrubber-cooler 6 with gas liquor supplied through line 7. As a result, the raw gas is cooled to temperatures in the range from 140° to 230° C. and is saturated with water vapor. The water containing raw gas together with heated gas liquor is supplied through line 8 to the waste-heat boiler 9, in which the raw gas is cooled further by a coolant consisting of feed water from line 10. The water vapor thus formed is withdrawn through line 20. The product gas leaves the waste-heat boiler 9 through line 11.

Gas liquor is collected in the sump of the waste-heat boiler 9 and is at temperatures in the range of 120° to 220° C. and still under the pressure which is maintained in the gasification reactor 1. That gas liquor flows in line 12 to a pressure relief vessel 13, in which the pressure is relieved by at least 2 bars. After the pressure relief, the pressure is somewhat higher than that in the fluidized bed gasifier 15. The flashed-off vapor consists mainly of water vapor and is not compressed further. It is supplied through line 14 to the reactor 15 for the gasification in a fluidized bed. A particle stream of that flashed-off vapor may be supplied to the fluidized bed gasifier through a line 14a or to a fluidized-bed furnace 38 through a line 14b.

Gas liquor which has been relieved from at least part of its superatmospheric pressure and has thus been cooled is collected in the pressure relief vessel 13 and flows off in line 17. By means of a pump 18, part of that gas liquor is recycled through line 7 to the scrubber-cooler 6 and is heated in a heat exchanger 19, which is fed through line 20 with water vapor generated in the waste-heat boiler 9.

Residual gas liquor is supplied through line 21 to another pressure relief vessel 22 and is pressure-relieved therein approximately to atmospheric pressure. The pressure-relieved gas liquor is conducted in line 23 to means for its further processing, particularly for a removal of phenols. Vapor flashed off in the pressure relief vessel 22 is condensed in the cooler 24 and the condensate is supplied through line 25 to the line 23 and is conducted therein together with the pressure-relieved gas liquor. Tar is withdrawn through line 26 and may also be supplied to the fluidized-bed gasifier 15.

Fine-grained solid fuels having particle sized below 5 mm, preferably below 2 mm, are gasified in the reactor 15 with oxygen supplied through line 31 and with water vapor supplied through lines 14 and 14a. The gasification is effected in a fluidized bed, particularly in a circulating fluidized bed which is operated at high fluidizing gas velocities. Product gas and solids leave the reactor 15 through lines 32 and are separated in the cyclone 33 into product gas, which is withdrawn through line 34, and solids, a major part of which is withdrawn through lines 35 and 36 to the fluidized-bed region of the reactor 15. The solids which have a lower or slight carbon content as a result of the gasification in the reactor 15 are withdrawn in part through line 37.

The water vapor required for the gasification in the fluidized bed reator 15 comes from the pressure relief vessel 13. The gasification in the fluidized bed, e.g., in the circulating fluidized bed which is preferred here, is effected at a water vapor to oxygen ratio of generally 0.8 to 1.3. That water vapor to oxygen ratio depends, inter alia, on the ash properties as well as on whether a formation of agglomerated ash or fine-grained ash by the gasification in the fluidized bed is desired. Additionally, water vapor at a higher rate can be supplied either through line 14 or separately through line 14a. However, that surplus steam takes part only to a small extent in the gasification reactions and in most cases leaves the reactor 15 in an undecomposed state. On the other hand, the phenol and fatty acid vapors contained in the flashed-off vapor as well as other vaporous distillation products contained in the gas liquor are gasified in the reactor 15 so that they contribute to the production of additional gas. That consumption of gas liquor in the form of flashed-off vapor reduces also the load on the equipment in which the gas liquor is purified by various processes, such as the removal of phenols.

The fluidized bed reactor 15 for the gasification can be supplied with fuels consisting of tar from the vessel 22 or of oils or phenols which become available in the moving bed gasification process at locations not shown here so that less coal needs to be supplied through line 30.

The solids in line 37 can be supplied in a manner known per se to a furnace 38, which is indicated by dotted lines. That furnace can be supplied with air line 39 and with part of the flashed-off vapor through line 14b. Waste materials as well as tars and phenols may be supplied to the furnace through line 49.

The product gas leaving the fluidized bed gasifier through line 34 contains water vapor and is virtually free of phenols and fatty acids. That product is cooled in a waste heat boiler 40. The resulting condensate is withdrawn through line 41 and after a known water treatment may be used as cooling water or feed water. The cooled gas can be processed separately from the gas conducted in line 11. For the joint processing shown on the drawing, the product gas from the waste heat boiler 40 is compressed in the compressor 42 approximately to the pressure prevailing in line 11 and the gases are then jointly conducted through a heat exchanger 43. Heated gas is conducted in line 44 to a shift converter 45, which is known per se and in which part of the water content of the gas is used up by the reaction $CO + H_2O \rightarrow CO_2 + H_2$. A shift conversion process which can be employed for that purpose is described in German Offenlegungsschrift No. 27 09 768 and the corresponding U.S. Pat. No. 4,161,393. The shift-converted gas delivers part of its heat in the heat exchanger 43 and is subsequently indirectly cooled in the heat exchanger 46. The resulting condensate is withdrawn through line 47. Thereafter the shift-converted gas may be used, e.g., for synthesis processes and may first be subjected to fine purification.

EXAMPLE

A plant as illustrated on the drawing is operated as follows:

2500 kg hard brown coal (lignite) containing 12 percent ash and 28 percent moisture are charged to the moving bed gasifier 1 and are gasified therein at 30 bars with 350 m³ oxygen and 2300 kg steam (all volumes in m³ are volumes at standard temperature and pressure). The 2900 m³ raw gas thus produced (on a dry basis) have the following gas analysis in percent by volume:

| | |
|---|---|
| CO$_2$ | 30 |
| CO | 20 |
| H$_2$ | 38 |
| CH$_4$ | 11 |
| N$_2$ | 1 |
| | 100 vol. percent |

The raw gas leaving the gas producer 1 is at a temperature of 300° C. and contains also 1700 kg water vapor and 127 kg tar, oil, phenols and other distillation products. In the scrubber-cooler 6, the raw gas is scrubbed and cooled with 5799 kg gas liquor supplied through line 7 and together with the gas liquor is supplied through line 8 to the waste heat boiler 9. The gas leaving the waste heat boiler 9 is at a temperature of 170° C. and still contains 870 kg water vapor. 1178 kg saturated steam at 6 bars are produced in the waste heat boiler and withdrawn through line 20. 6629 kg gas liquor at a temperature of 180° C. are drained through line 12 and are composed of 5799 kg water circulated through line 7 and 830 kg gas liquor which has condensed from the raw gas in the scrubber-cooler and the waste heat boiler. That gas liquor flows to the pressure relief vessel 13 and is pressure-relieved therein from about 30 bars to 2.5 bars. 700 kg vapor are flashed off and in addition to water vapor contain 6 kg phenols, 1.5 kg fatty acids and 6 kg ammonia in the form of vapor. Said mixed vapors are supplied through line 14 to the fluidized bed gasifier 15.

5799 kg gas liquor from the pressure relief vessel 13 are raised to a pressure of 32 bars by the pump 18 and are heated from 127° C. to 147° C. in the heat exchanger 19, which is supplied with saturated steam from the waste heat boiler 9. The thus heated gas liquor is supplied to the scrubber-cooler 6 and together with the condensed vapors from the raw gas leaves the sump of the waste heat boiler 9 at 180° C. so that that cycle is closed.

130 kg tar-containing gas liquor are delivered through line 21 to a separator 22 for separating tar and gas liquor under approximately atmospheric pressure. Vapors which have been flashed off are condensed in the cooler 24. The gas liquor is delivered through line 23, e.g., to a phenol-extracting unit, which is succeeded by a biological purifying plant. Dust-containing tar is withdrawn through a line 26.

The scheme described thus far corresponds to the classical moving bed gasification according to the LURGI pressure gasification process with the difference that the rate at which gas liquor is withdrawn through line 23 is only 15 percent of the rate at which gas liquor which becomes available in the known process.

The present process is so flexible that the rate at which gas liquid is discharged can be decreased or increased and the rate at which vapor is flashed off and conducted through line 14 is correspondingly increased or decreased. That evaporated gas liquor is delivered to the fluidized bed reactor 15.

In the present example the fluidized bed gasifier 15 is operated with a circulating fluidized bed. In the example, only a partial gasification is effected and the residual coke is supplied through line 37 to the succeeding fluidized bed furnace 38. 1400 kg fine-grained hard brown coal (lignite) containing 14.3 percent moisture and 14.3 percent ash are supplied to the fluidized bed reactor 15 and are gasified therein with 365 m$^3$ oxygen under a slightly superatmospheric pressure. 350 kg water vapor are also required for the gasification. That water vapor and additional 350 kg water vapor are supplied in the form of flashed-off vapor obtained as a result of the gasification in a moving bed and are delivered through lines 14 and 14a. The 1450 m$^3$ raw gas (on a dry basis) leaving the fluidized bed gasifier are at a temperature of about 1000° C. and have the following gas analysis in percent bye volume:

| | |
|---|---|
| CO$_2$ | 23 |
| CO | 30 |
| H$_2$ | 42 |
| CH$_4$ | 3 |
| N$_2$ | 2 |
| | 100 vol. percent |

The raw gas also contains 769 kg water vapor and leaves the gas producer 15 through line 32 and the cyclone separator 33. The coke which has been separated in the cyclone 33 is recycled through lines 35 and 36. Part of the coke is supplied through line 37 to the fluidized bed furnace 38. In this example, 490 kg coke, which contain 200 kg ash, are burnt in the furnace 38.

The raw gas conducted in line 34 is cooled in the waste heat boiler 40, in which the sensible heat of the raw gas is used to produce steam. The cooling of that steam results in the condensation of 677 kg water vapor. That aqueous condensate no longer contains any organic constituents, such as phenols. As a result of its contact with ash constituents during the cooling, it may possible contain some inorganic constituents other than water, such as lime or some chlorine. As a result, its quality corresponds to that of fresh water, which as surface water or ground water is used for the water supply.

The 1450 m$^3$ raw gas which still contain 92 kg H$_2$O are compressed in the compressor 42 to the pressure of the gas leaving the moving bed gasifier and are mixed with the latter gas. The raw gases leaving the waste heat boiler 9 and the compressor 42 total 4350 m$^3$ (on a dry basis) and have the following composition in percent by volume:

| | |
|---|---|
| CO$_2$ | 28.3 |
| CO | 22.4 |
| H$_2$ | 39.7 |
| CH$_4$ | 8.3 |
| N$_2$ | 1.3 |
| | 100 vol. percent |

That gas contains also 962 kg water vapor.

The H$_2$/CO ratio of that gas is too low for its use, e.g., as synthesis gas for producing methane. For this reason there is a succeeding shift converter, in which the water vapor contained in the raw gas is used for the catalytic shift conversion reaction CO+H$_2$O→CO$_2$+H$_2$. The mixed gases are supplied through a gas-gas heater exchanger 43 and through line 44 to the catalyst-filled reactor 45. In the shift conversion reaction, water vapor is consumed and distillation products are hydrogenated. The gas is cooled in the cooler 47, in which 723 kg gas liquor become available, which contains less distillation products, particularly phenols, than the raw gas entering the shift converter 45.

The success of the novel process is apparent from the following water balance for this example:

Water Balance

The entire plant uses 2000 kg water vapor at 35 bars and 500° C. for the gasification.

The following quantities of gas liquor are produced and consumed in the entire plant:

| Plant Section: Moving Bed Gasifier 1 | |
|---|---|
| Gas liquor contained in the gas leaving the moving bed gasifier 1 | +1700 kg |
| gas liquor delivered as flashed-off vapor to the fluidized bed gasifier 15 | −700 kg |
| (a) Highly phenol-containing gas liquor in line 23 | −130 kg |
| Water vapor consumed in shift converter 45 | −239 kg |
| Water contained in the gas leaving the | +92 kg |
| fluidized bed gasifier is also supplied to the shift converter 45 | |
| (b) Slightly phenol-containing gas liquor from cooler 47 | +723 kg |

| Plant Section: Fluidized Bed Gasifier 15 | |
|---|---|
| Gas liquor supplied as flashed-off vapor through line 14 | +700 kg |
| Residual moisture content of coal from line 30 | +69 kg |
| (c) Purely aqueous condensate conducted through line 41 and containing no organic constituents | −677 kg |
| Remaining gas liquor in gas leaving the compressor 42 | +92 kg |
| Gas liquor which must be treated further and comes | 130 kg |
| from line 23 | |
| from cooler 47 | 723 kg |
| Total | 853 kg |

The 677 kg condensate from line 41 are no longer gas liquor but fresh water for the water supply.

Instead of 1700 kg gas liquor to be treated in a plant having no fluidized bed gasifier 15, only 853 kg gas liquor must be treated. The advantages afforded by the combined process including a gasification in a fluidized bed will not be fully recognized unless the following is taken into account:

An entire plant consisting of the moving bed gasifier 1 and the fluidized bad gasifier 15 provided with a fluidized bed furnace 38 as well as a gas purifier not shown here is capable of producing a synthesis gas which, e.g., in a catalytic methanating plant can be converted to 1000 m³ CH₄. Additionally, the fluidized bed gasifier provided with a fluidized bed furnace can deliver from the associated waster heat boilers the gasifying steam and additional steam for power production (German Offenlegungsschrift No. 31 38 124 and U.S. Pat. No. 4,426,810).

| If the synthesis gas for producing 1000 m³ CH₄ were produced only by the moving bed gasifier, then water vapor would be consumed for gasifying. | 2803 kg |
|---|---|
| The raw gas leaving the moving bed gasifier contains evaporated gas liquor | 2383 kg |
| water vapor are consumed in the shift converter. | −128 kg |
| The remaining gas liquor amounting to must be treated for an extraction of phenols and a biological purification. This quantity of contaminated gas liquor is 2.64 times the quantity | 2255 kg | which becomes available in the process according to the invention. Moreover, in the process using no gasification in a fluidized bed the steam for gasifying and the steam for driving turbines must be separately produced.

What is claimed is:

1. A process of gasifying solid fuels with gasifying agents containing oxygen and water vapor in a moving bed gasifier and in a fluidized bed gasifier, comprising gasifying coarse, grained solid fuels at a pressure of 5 to 150 bars in a moving bed gasifier, said fuels slowing descending in said moving bed gasifier, introducing the gasifying agents into said moving bed from below, withdrawing incombustible mineral constituents from the bottom of the moving bed gasifier as solid ash or liquid slag, withdrawing a product gas at temperatures of 250° to 700° C. from the moving bed gasifier, feeding said product gas into a scrubber-cooler wherein the gas is intensely contacted with a first stream of aqueous condensate, withdrawing a mixture of said first stream of aqueous condensate and said product gas from the scrubber-cooler, said product gas withdrawn from the scrubber-cooler having a temperature in the range of 140°–230° C., feeding said mixture into a waste-heat boiler wherein said mixture is cooled, separating a second stream of aqueous condensate from the product gas in said waste-heat boiler, said second stream of aqueous condensate having a temperature of 120° to 220° C., the pressure in said waste-heat boiler being the same as in said moving bed gasifier, pressure-relieving the second stream of aqueous condensate into a pressure relief vessel, the pressure in said vessel being at least 2 bars below the pressure in said waste-heat boiler, separately withdrawing a flashed-off vapor and a third stream of aqueous condensate from said vessel, recycling part of said thrid stream of aqueous condensate to said scrubber-cooler as said first stream, gasifying fine-grained solid fuels with oxygen and water vapor in a fluidized bed gasifier at a pressure which is lower than the pressure in said moving bed gasifier, withdrawing a product gas at a temperature of 800° to 1200° C. from said fluidized bed gasifier, supplying at least part of said flashed-off vapor to the fluidized bed gasifier at least at the rate at which water vapor is required for gasification in the fluidized bed gasifier.

2. A process according to claim 1 wherein said gas liquor is pressure relieved to a pressure 3. A process according to claim 1 wherein the gas liquor is pressure-relieved by at least 2 bars to a pressure above the pressure in the fluidized bed gasifier.

4. A process according to claim 1, wherein tar and/or phenols are supplied to the fluidized bed gasifier.

5. A process according to claim 4, wherein the gas liquor remaining after said pressure is relieved is subjected to a further pressure relieving step, a tar containing liquid is withdrawn therefrom and fed to said fluidized bed gasifier.

6. A process according to claim 1 wherein the water vapor contained in the product gas leaving the fluidized bed gasifier is condensed by a cooling of said gas and the condensate is treated separately from the gas liquor formed by the gasification in the moving bed.

7. A process according to claim 1, wherein part of the solids leaving the fluidized bed gasifier are burnt in a furnace, which is supplied with part of the flashed-off vapor.

8. A process according to claim 7, wherein tar and/or phenols are supplied to the furnace.

9. A process according to claim 1, wherein carbon dioxide is fed to said moving bed gasifier.

10. A process according to claim 1, wherein product gas from the moving bed gasifier is introduced into a scrubber-cooler to which pressure relieved gas liquor is added, the resultant mixture is passed to a waste-heat boiler and therein cooled, gas is withdrawn from said waste heat boiler under pressure, product gas from said fluidized bed gasifier is cooled, compressed to approximately the prevailing pressure of said gas from the waste heat boiler and combined therewith.

11. A process according to claim 10, wherein the combined gas streams are subjected to a shift conversion.

12. A process according to claim 11, wherein the resultant shift gas conversion product is cooled by indirect heat exchange with fed gas to the shift conversion.

* * * * *

UNITED STATES PATENT AND TRADEMARK OFFICE
CERTIFICATE OF CORRECTION

PATENT NO. : 4,556,402

DATED : December 3, 1985

INVENTOR(S) : Paul Rudolph, et al.

It is certified that error appears in the above-identified patent and that said Letters Patent is hereby corrected as shown below:

Col. 8, line 40 — Delete "thrid" and substitute --third--

Col. 8, line 50 — After "pressure" second occurrence insert --of atmospheric pressure or higher up to bars below its pressure prior to being pressure relieved--

Signed and Sealed this

Sixth Day of May 1986

[SEAL]

Attest:

DONALD J. QUIGG

Attesting Officer

Commissioner of Patents and Trademarks